UNITED STATES PATENT OFFICE.

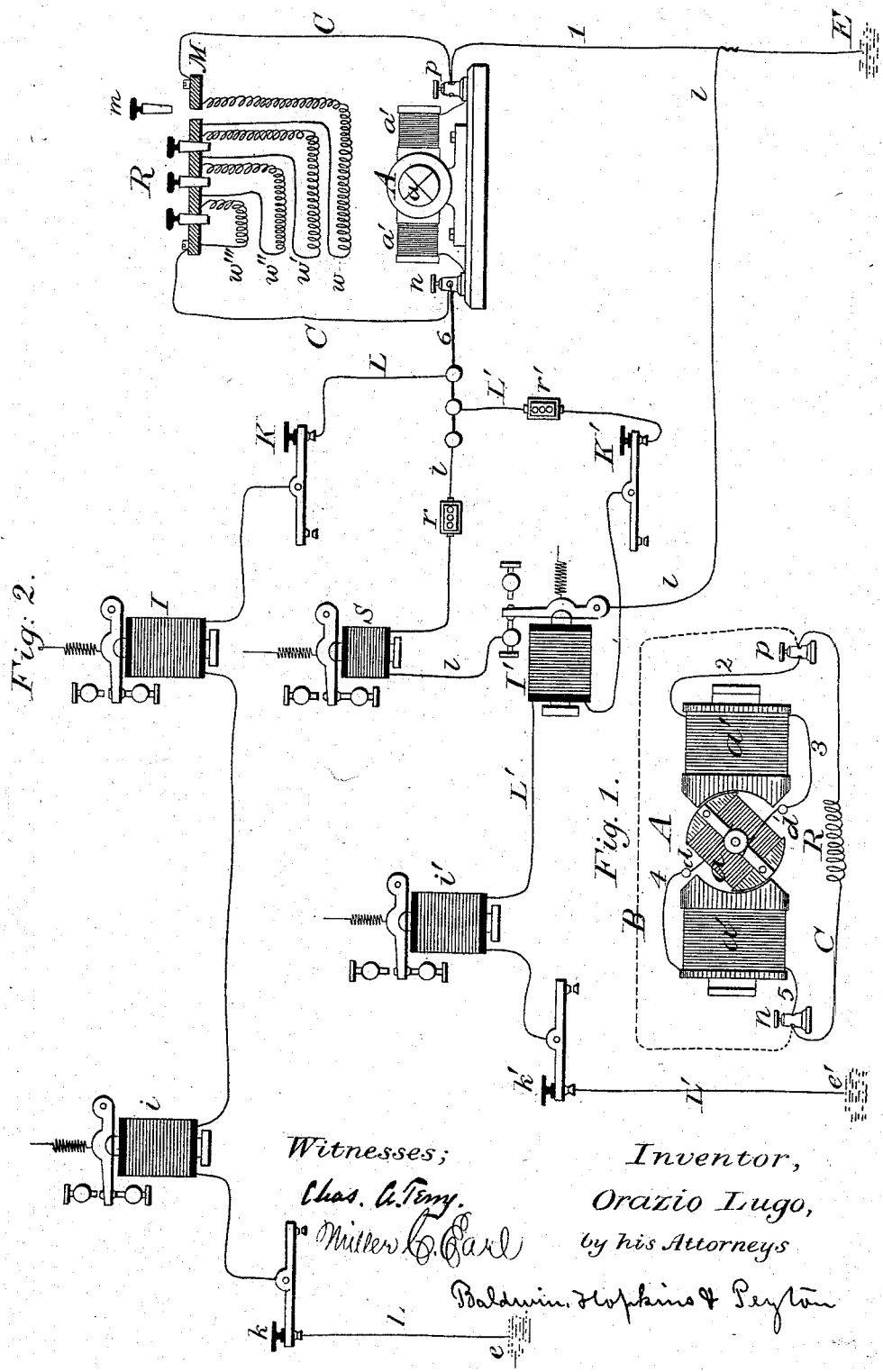

ORAZIO LUGO, OF NEW YORK, N. Y.

DYNAMO-ELECTRIC TELEGRAPHY.

SPECIFICATION forming part of Letters Patent No. 235,688, dated December 21, 1880.

Application filed November 9, 1880. (No model.)

*To all whom it may concern:*

Be it known that I, ORAZIO LUGO, a citizen of the United States, residing in the city, county, and State of New York, have invented certain new and useful Improvements in Dynamo-Electric Telegraphy, of which the following is a specification.

My invention relates to that class of electric telegraphs in which dynamo-electricity is employed for the transmission of signals, instead of voltaic electricity generated by chemical action.

In the application of dynamo-electric generators to the production of electric currents for telegraphic transmission, certain difficulties have been encountered arising from the presence of conditions which do not exist in the various forms of voltaic batteries which have heretofore usually been employed as sources of electrical power. In the case of the chemical batteries employed for telegraphy, the resistance of the circuit or circuits exterior to the battery is very considerable, while the electro-motive force remains practically constant, thus producing a working current of uniform strength in the circuit or circuits connected with the battery. In the case of dynamo-electric generators, in which the reaction principle is employed, the introduction into the circuit of a high external resistance consisting of telegraph-lines which are alternately broken and closed at irregular and arbitrary intervals for signaling purposes produces wide variations in the resistance and subjects them to great variations in the electro-motive force, which variations are due to changes in the intensity of the magnetic field within which the currents have their origin. Furthermore, changes take place within the machine or generator itself, arising from the increase of the internal resistance by the heating of the wires and other causes. The variations referred to are also attended by changes in the amount of power required to drive the machine, and in the speed of rotation of the latter, which changes again react upon the strength of the current generated.

It has been determined by experiment that the most efficient arrangement of a dynamo-electric generator—that is to say, the one which produces the greatest useful effect with a given expenditure of power—is that known as the "single-current machine," in which the coils of wire surrounding the stationary electro-magnets which maintain the magnetic field and the external resistance are all included in the same circuit.

In the attempts which have hitherto been made to operate telegraphic circuits by means of dynamo-electric generators it has been considered impracticable to make use of the single-current machines, in consequence of the difficulties hereinbefore stated, and resort has been had to the class of generators known as "double-current machines," in which the armature is wound with two wires, one of these being connected in the circuit with the field-magnets and the other with the exterior circuit in which the work is to be done, or else two separate generators have been coupled together, one being a single-current machine, whose function it is to polarize its own field-magnets, and also those of the other generator, while the armature of the latter supplies the current to the exterior circuit.

My invention is designed to overcome the objections which have hitherto prevented the employment of the more efficient, simple, and economical single-current machine for telegraphic purposes, and to produce therefrom uniform and constant currents over one or many telegraph-lines of similar or varying lengths, which are operated by alternately breaking and closing the circuit in the usual manner.

The special object of the first part of my invention is so to organize a dynamo-electric generator in a telegraphic circuit that a constant circuit may be maintained through the coils of the armature and field-magnets of the generator, so as to keep them continuously and sufficiently polarized, whether the exterior working or telegraphic circuit be closed or open, which end I attain by combining a telegraphic circuit, a dynamo-electric generator, (the revolving armature and stationary field-magnet of which are included in said telegraphic circuit,) and a shunt-circuit of low resistance, connecting the opposite poles of the generator with each other, the resistance of the shunt-circuit being greater than the internal resistance of the generator, but less than that of the exterior working or telegraphic circuit.

The object of the second part of my invention is to maintain a proper relation between the resistance of the shunt connecting the opposite poles of a dynamo-electric generator and the resistance of the exterior or working circuit, which end I attain by providing suitable means for increasing or diminishing the resistance of said shunt-circuit.

The object of the third part of my invention is to enable one or more telegraphic lines, which are operated in the usual manner by the opening and closing of a key or keys, to be thus operated in the exterior circuit of a dynamo-electric generator without interfering with the maintenance of the field of force in said generator, which end I attain by combining, with the said lines, keys, and generator, a constantly-closed shunt of low resistance, connecting the opposite poles of the said generator, the resistance of the shunt being greater than the internal resistance of the generator, but less than that of the telegraphic circuit.

The object of the fourth part of my invention is to maintain the proper relation between the joint resistance of two or any required number of telegraphic lines which constitute the exterior circuit of a dynamo-electric generator and the resistance of the shunt-circuit which connects the opposite poles of said generator, which end I attain by combining, with said lines, generator, and constantly-closed shunt-circuit connecting the poles of said generator, suitable means for increasing or diminishing the resistance of said shunt-circuit.

The object of the fifth part of my invention is to maintain a proper relation between the resistance of the exterior or working circuit, when composed of two or more telegraph-lines, and the resistance of the dynamo-electric generator, and of the shunt-circuit connecting the opposite poles thereof, which end I attain by providing means for increasing and decreasing the resistance of the several telegraph-lines which constitute the exterior or working circuit.

The object of the sixth part of my invention is to enable a proper relation to be maintained between the internal resistance of a dynamo-electric generator, the resistance of the telegraph line or lines constituting the exterior or working circuit, and the resistance of the shunt-circuit connecting the opposite poles of the said generator, which end I attain by providing means for increasing and decreasing the resistance of both the said shunt and the several lines which constitute the exterior circuit.

In the accompanying drawings, Figure 1 is a diagram of a dynamo-electric machine, illustrating the application of my invention thereto; and Fig. 2 is a diagram illustrating the application of my invention to the operation of a number of telegraph-lines.

Referring to Fig. 1, A represents a dynamo-electric generator, which may be of any suitable or well-known construction and driven by power in the usual manner. The generator which I prefer to use has its component parts arranged upon the principle shown in the diagram, in which $a$ is a revolving armature, enveloped in coils of wire, which moves within the magnetic field of the stationary or field magnets $a'$ $a'$. The positive and negative poles of the generator are at $p$ and $n$, respectively, and the circuit through the machine or generator is as follows: Commencing at the positive pole $p$, it passes by the wire 2 to the coils of one of the field-magnets $a'$, thence by wire 3 to the commutator-spring $d'$, thence through the coils of the rotating armature $a$, thence by commutator-spring $d$ and wire 4 to the other field-magnet, $a'$, and thence by wire 5 to the negative pole $n$. Now, if the generator be set in motion, no effect is produced until the opposite poles $p$ and $n$ of the generator are connected by a conductor, as indicated by the dotted line B; but as soon as this is done, a weak current is excited in the coils of the armature $a$, which also traverses the field-magnets $a'$ $a'$ and the conductor B, which is termed the "exterior circuit." The current excites magnetism in the cores of the field-magnets, which reacts upon the armature, and this action and reaction continues until the cores reach their maximum of magnetism; or the attraction between the revolving and stationary parts of the generator reduces the speed of the armature, and an equilibrium is established between the mechanical resistance produced by the attraction and the power which drives the machine, after which the current developed will remain practically uniform so long as the resistance of the exterior circuit, B, remains unchanged. If the circuit B is broken, the field-magnets and armature are instantly discharged, and the maximum power can only be regained by a series of actions and reactions after the circuit has been restored, as hereinbefore set forth. If the poles $p$ and $n$ of the generator be connected by a second conductor, C, technically termed a "shunt-circuit," the resistance of the portion of the circuit exterior to the generator will be diminished, and for that reason a greater quantity of electricity will be produced; and, moreover, under this arrangement, if the conductor B is broken or disconnected, the current through the field-magnets and armature will still be maintained through the shunt C, so that the generator will continue to act, though with somewhat diminished effect.

In order to produce the greatest useful effect in the operation of a dynamo-electric generator, two conditions must be observed: First, the resistance of the portion of the circuit without the machine must be approximately equal to that within the machine, and, second, the resistance exterior to the machine must be kept practically constant. The manner in which the conditions are fulfilled in the application of a dynamo-electric generator to the working of a number of telegraphic circuits of various lengths and resistances will now be explained.

Referring now to Fig. 2, A represents the dynamo-electric generator, having its armature-coils a and field-magnets a' a' connected together in the same circuit, as hereinbefore set forth.

The exterior or working circuit consists of the wire 1, which connects the positive pole p of the generator A with the earth at E, (and which, together with the earth itself, forms a conductor of no appreciable resistance,) the wire 6, also of no appreciable resistance, and three telegraphic circuits, L, L', and l, which branch from the wire 6 at the negative pole of said generator, and terminate, the first two in the earth at e and e', respectively, and the third in the wire 1 at the positive pole. These three circuits, which, taken collectively, form essentially the whole of the exterior or working circuit, are of very different lengths, and consequently their normal resistances vary in like proportion. The exterior resistance therefore is represented by the joint resistance of the three circuits, which, by a well-known law, is much less than that of any one of them individually.

The telegraph-lines L and L' are each provided with transmitting-keys, K k K' k', for alternately breaking and closing the circuit in order to transmit intelligible signals, and also with suitable receiving-instruments, I i and I' i', these being placed at different stations, as shown.

The line l l represents a local circuit of small resistance, which is employed to actuate a sounder or other like instrument, S, through the intervention of the instrument I', which is shown as a relay.

The shunt-circuit C C connects the positive and negative poles p and n of the generator A, as already explained, and it in effect forms a branch of the exterior circuit.

It has been already stated that the greatest useful effect is produced when the resistance of the interior and exterior circuits of the generator are approximately equal. Now, the joint resistance of the three working circuits or lines L, L', and l is necessarily much greater than that of the generator itself; consequently the resistance of the shunt-circuit C should bear a certain relation to that of the working-circuits, and also to that of the generator, being necessarily less than the former and greater than the latter. The resistance of the exterior circuit is subject to change, inasmuch as a greater or less number of lines may be required to be worked from it at different times, while the resistance of the generator itself is practically constant. In order, therefore, to maintain the proper relation between the resistances of different portions of the system, it is desirable to render the resistance of the shunt-circuit adjustable, which may be done by varying its length or otherwise. I prefer to use for this purpose a rheostat, R, (see Fig. 2,) which is composed of a metallic bar, M, divided into sections which are normally connected by metallic pegs, but may be separated by the withdrawal of any one of the pegs, as at m. Coils of wire of graduated lengths, as w w' w'' w''', are connected from one section to another of the bar M. Thus the withdrawal of the peg m, as in Fig. 2, adds the length and resistance of the wire w to the shunt-circuit, and in like manner any of the shorter lengths may be inserted or withdrawn at pleasure.

It is obvious that any required scope of adjustment in the length and resistance of the wire C C may be obtained in this manner.

Where the difference in the length and resistance of the different lines is very great—as, for example, the line L, which may offer a resistance of several thousand units, and the local circuit l, which may offer not more than ten similar units—the current will tend to divide itself very unequally, and by far the greater portion of the total current will tend to traverse the shorter lines. This effect is objectionable, not merely by reason of an excessive waste of current, and consequently of power, but also because the breaking and closing of the shorter circuits produces considerable variation in the total resistance of the exterior circuit, which, for reasons hereinbefore given, it is desirable to avoid. I therefore insert adjustable rheostats or resistances in all the shorter circuits, as at r and r', which are constructed in the same manner as the rheostat R, already described. By this means the resistances of the shorter lines may be so increased that the joint resistance of the exterior or working circuit will be very great compared with that of the generator and its shunt, by which another important advantage is secured, in that the system becomes automatically self-regulating. The current required for operating even a large number of lines of considerable resistance is far within the capacity of the generator to supply. If, in closing and breaking the several circuits by means of the keys, a considerable number of the lines should happen to be opened simultaneously, the resistance of the external circuit becomes greater, and consequently the current through the field-magnets is weakened and the electro-motive force of the generator correspondingly decreased, while the opposite effect follows if all the lines are closed and more current required. Thus, by placing adjustable rheostats in all the branches of the exterior circuit, except the one having the greatest resistance, the proper relations of resistance between the working-circuits, the shunt-circuit, and the generator may be preserved at all times.

I also remark that as the shunt-circuit C C must always be of a resistance exceeding the internal resistance of the generator, the heat developed in the circuit will appear in the shunt-circuit, and not within the generator—an incidental advantage of much importance. As the machine remains cold, its internal resistance therefore continues constant, and the current derived therefrom is consequently uniform.

I claim as of my own invention—

1. The combination, substantially as hereinbefore set forth, of a telegraphic circuit, the revolving armature-coil and stationary field-magnet of a dynamo-electric generator included in said circuit, and a shunt-circuit of low resistance connecting the opposite poles of the generator, the resistance of said circuit being greater than the internal resistance of the machine, but less than that of the telegraphic circuit.

2. The combination, substantially as hereinbefore set forth, in a dynamo-electric generator, of a revolving armature-coil and a stationary field-magnet, both of which are included in the same circuit with the exterior resistance, a shunt-circuit which connects the poles of the generator with each other, and thereby acts to keep the circuit of the armature and field-magnet continuously closed without reference to the condition of the exterior or working circuit, and means for adjusting or regulating the electrical resistance of said shunt-circuit.

3. The combination, substantially as hereinbefore set forth, of a dynamo-electric generator, one or more electric circuits connected therewith, one or more keys for transmitting signals through said circuit or circuits by alternately breaking and closing the same, and a constantly-closed shunt-circuit of low resistance connecting the opposite poles of the said generator, the resistance of the shunt-circuit being greater than the internal resistance of the generator, but less than that of the telegraphic circuit.

4. The combination, substantially as hereinbefore set forth, of a dynamo-electric generator, one or more electric circuits connected therewith, one or more keys for transmitting signals through said circuit or circuits by alternately breaking and closing the same, a constantly-closed shunt-circuit connecting the opposite poles of the said generator, and means for adjusting or regulating the electrical resistance of said shunt-circuit.

5. The combination, substantially as hereinbefore set forth, of a dynamo-electric generator, one or more electric circuits connected therewith, one or more keys for transmitting signals through said circuit or circuits by alternately breaking and closing the same, means for adjusting or regulating the resistance of said circuit or circuits, and a constantly-closed shunt-circuit connecting the opposite poles of the said generator.

6. The combination, substantially as hereinbefore set forth, of a dynamo-electric generator, one or more electric circuits connected therewith, one or more keys for transmitting signals through said circuits by alternately breaking and closing the same, means for adjusting or regulating the resistance of said circuit or circuits, a constantly-closed shunt-circuit connecting the opposite poles of said generator, and means for adjusting or regulating the electrical resistance of said shunt-circuit.

In witness whereof I have hereunto set my hand this 8th day of November, A. D. 1880.

ORAZIO LUGO.

Witnesses:
WM. C. WITTER,
CHAS. A. TERRY.